May 27, 1952　　　G. R. ROESCH　　　2,598,133
BRAKE OPERATING MECHANISM
Filed Jan. 23, 1950
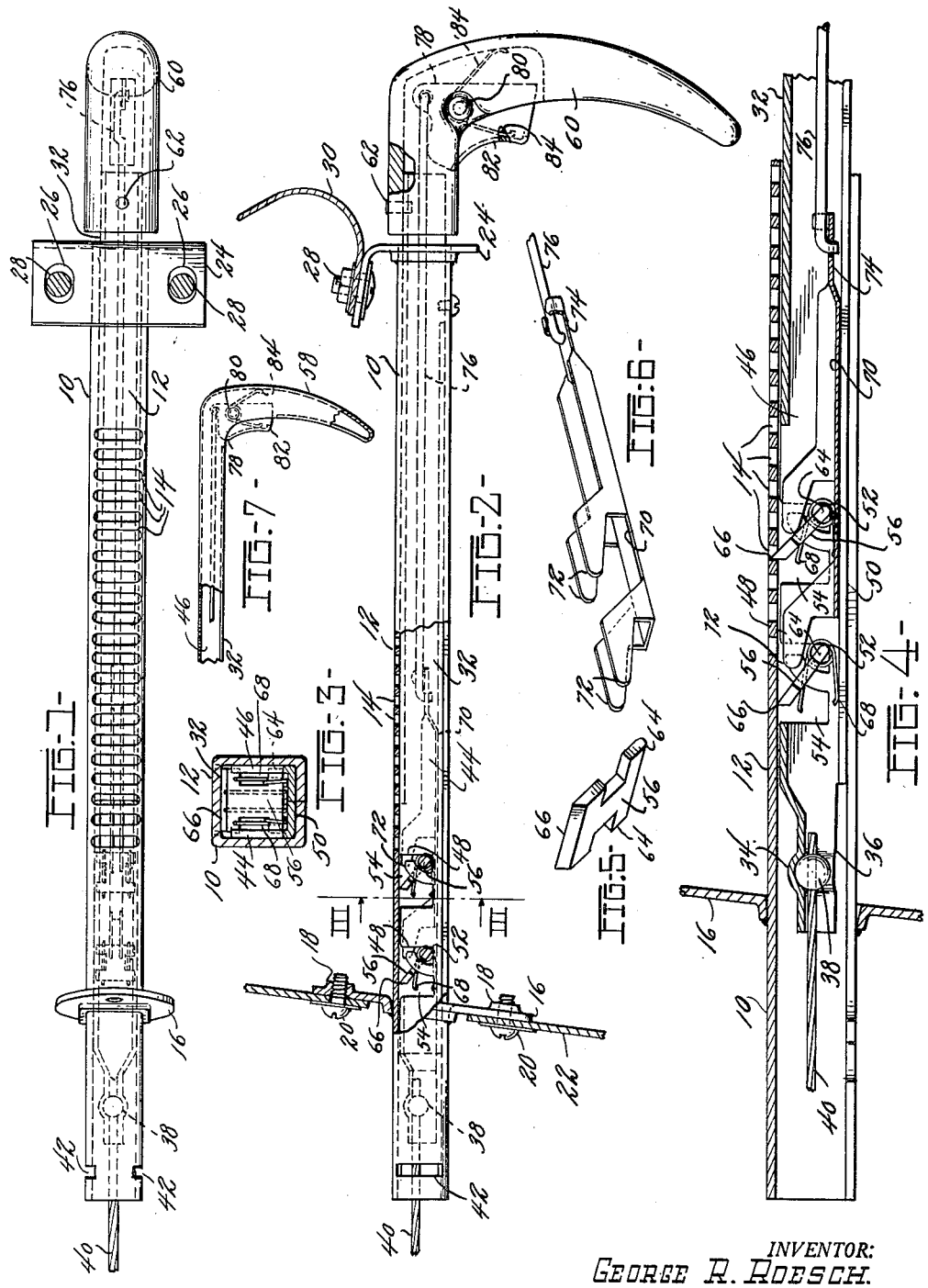
INVENTOR:
GEORGE R. ROESCH.
BY
ATTY.

Patented May 27, 1952

2,598,133

UNITED STATES PATENT OFFICE 2,598,133

BRAKE OPERATING MECHANISM

George R. Roesch, Toledo, Ohio, assignor to The Peters Stamping Company, Perrysburg, Ohio, a corporation of Ohio Application January 23, 1950, Serial No. 140,110

3 Claims. (Cl. 74—503)

This invention relates to brake lever mechanisms particularly adapted for automotive vehicles.

An object of this invention is to provide a gun-grip, trigger release type of brake control wherein straight line operation of the grip can cause the brakes to be set or released at will.

Another object of this invention is to provide a novel pawl and ratchet arrangement within the mechanism by which the brakes may be set.

Another object of this invention is to provide a novel pawl and ratchet arrangement for a brake mechanism which embodies a sturdy construction employing comparatively light weight parts, yet allowing adjustments in small increments in the movement of the grip.

Another object of this invention is to provide a brake adjusting mechanism of the type herein, employing a maximum of parts stamped from sheet metal utilizing the advantages of this type of construction.

And another object of this invention is to provide a mechanism of the type described and for the purposes indicated which incorporates a major percentage of stamped parts, yet in operation produces a maximum safety factor combined with an extreme ease of control.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a plan view of a brake control unit of the invention herein;

Fig. 2 is a side elevation of the unit of Fig. 1, illustrating a mount therefor within a motor vehicle;

Fig. 3 is a view on the line III—III, Fig. 2;

Fig. 4 is an enlarged longitudinal section through a portion at the left of Fig. 1;

Fig. 5 is a perspective view of one of the pawls;

Fig. 6 is a perspective view of the pawl releasing cam providing slide; and

Fig. 7 is a side elevation of a modified construction for the operating handle.

The invention comprises a main housing 10 in the form of a tubular guide which has a polygonal cross-section preferably approximating a square.

The upper face 12 of the guide is provided with a longitudinal series of equally spaced apertures 14 therethrough in the form of transverse slots. The sides of these slots provide the teeth of a ratchet and pawl mechanism.

The guide 10 has a plate welded thereto adjacent its forward end which plate is provided with embossed nuts 18 to receive bolts 20 for mounting the plate 16 to bulkhead 22 of a motor vehicle. Adjacent the opposite or rear portion of the guide, bracket 24 is welded thereto and is provided with slots 26, through which fastening means 28 may extend in attaching this bracket 24 to an instrument panel 30. The slots 26 allow for possible variations in the distances between bulkheads and panels.

This rigidly mounted guide has telescopically disposed therein, a first or major slide member 32, which at its inner end adjacent the plate 16, carries seat 34 opposite slot 36. This slide is also a stamping having a general polygonal cross-section to nicely nest within the guide 10. The seat 34 and slot 36 arrangement provides means for receiving and attaching bead 38 on cable 40, which is the operating extension for the brake to be controlled by the device herein. The anchored cable is usually housed in a flexible conduit which has a fitting engaging the guide 10. Slots 42 are provided in the guide to accommodate the fitting.

The U-shaped portion of the slide 32 provides a pair of opposing sides or legs 44, 46, which inwardly from the seat 34, have slots 48 cut downwardly and arced toward the web 50 to terminate in seats 52. Complementary slots 54 adjoin the slots 48. There may be a plurality of these sets of slots in aligned pairs to accommodate pawls 56 mounted and operable therein as later described.

The slide 32 extends from the slot providing region outwardly beyond the terminal of the guide 10 adjacent the bracket 24. The slide may have terminal configuration to provide integral gungrip type handle 58 or there may be a separate handle 60 attached thereto by suitable fastening means 62 such as a rivet or screw.

The pawls 56 are H-shaped elements having one pair of their aligned legs 64 in seats 52 serving as pivots for the opposite edge or tip 66 swinging in the slots 54. The legs 64 are positioned in the slide 32 by passing them vertically through the slots 48 into the seats 52. Canting the pawl 56 from this vertically positioned assembly rocks the pawl on the axis of its legs 64 with the seats 52 serving as bearings therefor and as these legs 64 are wider than the slots 48, the pawls are thus keyed to the slide 32. Springs 68 urge the tips 66 toward the upper face 12 of the guide and as the slide is shifted to a position where a pawl comes into alignment with a slot 14, the tip 66 is forced thereinto. The pawls are spaced so that only one tip 66 may be in an aperture 14 at any one time. This provides a small increment or adjustments steps of one half the distance between two adjacent openings 14. The pawls are tilted so that the slide 32 may be withdrawn from the guide with the pawls preventing movement in the opposite direction.

The springs 68 engage an inner edge of the tip 66 and envelope a pivot 64 to extend therefrom to contact the web 50.

Means are provided to release the pawls from the slots. To this end, a second slide 70 is nested within the slide 32. This is also a stamping, U-shaped in cross-section and provides fingers or cams 72, one pair of fingers 72 being provided for each pawl. The tips of the cams 72 are disposed adjacent an upper portion of the pawls when the pawls are in slot engagement. The slide 70 has an extension 74 which is fabricated to engage and pivotally lock link 76 thereto. This link extends to member 78 (also a stamping) pivoted on fulcrum 80, which member provides a trigger portion 82 shiftable against the resistance of spring 84 acting between said trigger and the handle 58 or 60.

When the handle is gripped, the slide 32 may be pulled outwardly from the guide thereby pulling the cable 40 to set the brake mechanism. The pawls will alternately engage the slots and the mechanism can be set at the desired position. To release the brake, an operator's fingers pulls the trigger toward the handle and in response, the slide 70 is shifted toward the cable and the cams 72 engage and swing the pawls 56 clear of the slots 14. The brake mechanism employes cable retracting mechanism which can in turn, draw the slide 32 back into the guide 10.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and is desired to secure by United States Letters Patent:

1. In brake mechanism of the class described, a tubular guide having a substantially polygonal cross-section, means for fixedly mounting said guide to a support, a first slide reciprocable in said guide, said slide being U-shape in cross-section, means for engaging a brake operating cable on one end of the slide, an operating handle extending from the opposite end of said slide, a ratchet and pawl device between said slide and guide provided by an H-shaped pawl pivoted on two of its aligned legs in the opposing sides of said U-shaped slide and having its other pair of aligned legs provide a tip to engage into a series of slots transversely across one side of said guide in longitudinal alignment therealong, spring means between said pawl and slide urging said tip into a slot, a second U-shaped slide nested within said first slide and longitudinally shiftable therein, said second slide having one of its sides configured to provide a cam, a trigger on said handle, and a connection between said trigger and second slide, whereby operation of the trigger can shift said cam into pawl engagement to rock said pawl against the resistance of said spring.

2. In brake operating mechanism embodying a tubular guide having a series of longitudinally aligned apertures, a first slide in said guide, a handle by means of which said first slide may be moved along the guide, a pawl carried by said first slide for coacting with said apertures to provide a ratchet and pawl action therebetween, said pawl having spring means urging the same into aperture engagement, a second slide in said first slide, said second slide having pawl engaging fingers, a trigger adjacent said handle, a connection between said trigger and second slide for imparting trigger movement to the slide to cause said fingers to contact and move the pawl out of aperture engagement, and a connection from said first slide to the brake.

3. The structure set forth in claim 2 wherein said second slide embodies a U-shaped stamping nesting within said first slide with its opposing sides providing with extensions to form a pair of said fingers and having its connecting web configured to provide an anchor for the connection from the trigger thereto.

GEORGE R. ROESCH.

REFERENCES CITED

The following references are of record in the file of this patent:

UNITED STATES PATENTS

| Number | Name | Date |
|---|---|---|
| 2,158,323 | Ericson et al. | May 16, 1939 |
| 2,177,456 | Irving | Oct. 24, 1939 |
| 2,377,691 | Jandus | June 5, 1945 |
| 2,543,509 | Sandberg | Feb. 27, 1951 |

FOREIGN PATENTS

| Number | Country | Date |
|---|---|---|
| 516,309 | Great Britain | Dec. 29, 1939 |